United States Patent
Hussain et al.

(10) Patent No.: US 12,189,519 B1
(45) Date of Patent: Jan. 7, 2025

(54) THIRD-PARTY EXTENSION INTEGRATION, VERIFICATION, AND PUBLICATION FOR DISTRIBUTED ENVIRONMENTS

(71) Applicant: Amazon Technologies, Inc., Reno, NV (US)

(72) Inventors: Amjad Hussain, Bellevue, WA (US); Diwakar Chakravarthy, Kirkland, WA (US); Prabhu Anand Nakkeeran, Kirkland, WA (US); Asif Hussain, Redmond, WA (US); Rahul Sharma, Seattle, WA (US); Olivier Robert Munn, Snohomish, WA (US); Christopher T. George, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 295 days.

(21) Appl. No.: 17/364,224

(22) Filed: Jun. 30, 2021

(51) Int. Cl.
*G06F 11/36* (2006.01)
*G06F 8/70* (2018.01)

(52) U.S. Cl.
CPC ............ *G06F 11/3688* (2013.01); *G06F 8/70* (2013.01); *G06F 11/3664* (2013.01); *G06F 11/3692* (2013.01)

(58) Field of Classification Search
CPC ............ G06F 11/3688; G06F 11/3664; G06F 11/3692; G06F 8/70
See application file for complete search history.

(56) References Cited

U.S. PATENT DOCUMENTS

| | | | |
|---|---|---|---|
| 9,602,614 B1* | 3/2017 | Shankaran | H04L 67/568 |
| 10,152,449 B1* | 12/2018 | Ward, Jr. | G06F 15/173 |
| 10,250,612 B1* | 4/2019 | Raposa | H04L 63/108 |
| 10,298,770 B1* | 5/2019 | Liu | H04M 7/009 |
| 10,678,678 B1* | 6/2020 | Tsoukalas | G06F 11/3664 |
| 11,119,883 B1* | 9/2021 | Eberlein | G06F 11/3006 |
| 11,514,129 B1* | 11/2022 | Pillsbury | H04L 67/75 |
| 11,520,688 B1* | 12/2022 | Poirier | G06F 11/3696 |
| 11,868,448 B1* | 1/2024 | Chowdhury | G06F 9/5072 |
| 2007/0037521 A1* | 2/2007 | Babut | H04L 67/564 379/1.01 |

(Continued)

OTHER PUBLICATIONS

Priefer, Dennis, Peter Kneisel, and Daniel Strüber. "Iterative model-driven development of software extensions for web content management systems." Modelling Foundations and Applications: 13th European Conference, ECMFA 2017, Jul. 19-20, 2017, Springer International Publishing, 2017. (Year: 2017).*

(Continued)

*Primary Examiner* — Kevin L Young
*Assistant Examiner* — Joanne G Macasiano
(74) *Attorney, Agent, or Firm* — Hogan Lovells US LLP

(57) ABSTRACT

Systems and methods provide for submission, verification, and validation of one or more code packages associated with provisioning logic for third-party applications. A user may request verification as a publisher and submit a code package for use with a third-party application within a resource provider environment. The code package may be tested and, upon passing, be published to a public repository for discovery and use by other users. The code package may form part of an extension that is integrated into a template that enables automated provisioning of resources and applications.

20 Claims, 13 Drawing Sheets

(56) References Cited

U.S. PATENT DOCUMENTS

| | | | | |
|---|---|---|---|---|
| 2014/0019983 | A1* | 1/2014 | Rassin | G06Q 10/06 |
| | | | | 718/102 |
| 2014/0297866 | A1* | 10/2014 | Ennaji | G06F 9/45533 |
| | | | | 709/226 |
| 2015/0234725 | A1* | 8/2015 | Cillis | H04L 43/50 |
| | | | | 714/33 |
| 2017/0249238 | A1* | 8/2017 | Watt | H04L 43/08 |
| 2018/0060060 | A1* | 3/2018 | Wilson | G06F 21/629 |
| 2018/0137041 | A1* | 5/2018 | Cosgrove, Jr. | G06F 11/3688 |
| 2020/0184156 | A1* | 6/2020 | Badr | G06F 40/35 |
| 2022/0342663 | A1* | 10/2022 | Barkaee | G06F 8/77 |

OTHER PUBLICATIONS

Wang, Yige, Ruizhu Huang, and Weijia Xu. "Authentication with User Driven Web Application for Accessing Remote Resources." Proceedings of the Practice and Experience on Advanced Research Computing. 2018. 1-7. (Year: 2018).*

Indradeep, V. Sreeranga P. Rajan V., et al. "Software applications validation environment: Save." Fujitsu Sci. Tech. J 43.4 (2007): 398-411. (Year: 2007).*

* cited by examiner

THIRD-PARTY EXTENSION INTEGRATION, VERIFICATION, AND PUBLICATION FOR DISTRIBUTED ENVIRONMENTS

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The user may wish to provision a number of different resources associated with their accounts, but may experience problems where resources built or managed by different providers.

BRIEF DESCRIPTION OF THE DRAWINGS

Various embodiments in accordance with the present disclosure will be described with reference to the drawings, in which.

DETAILED DESCRIPTION

Figure 1:
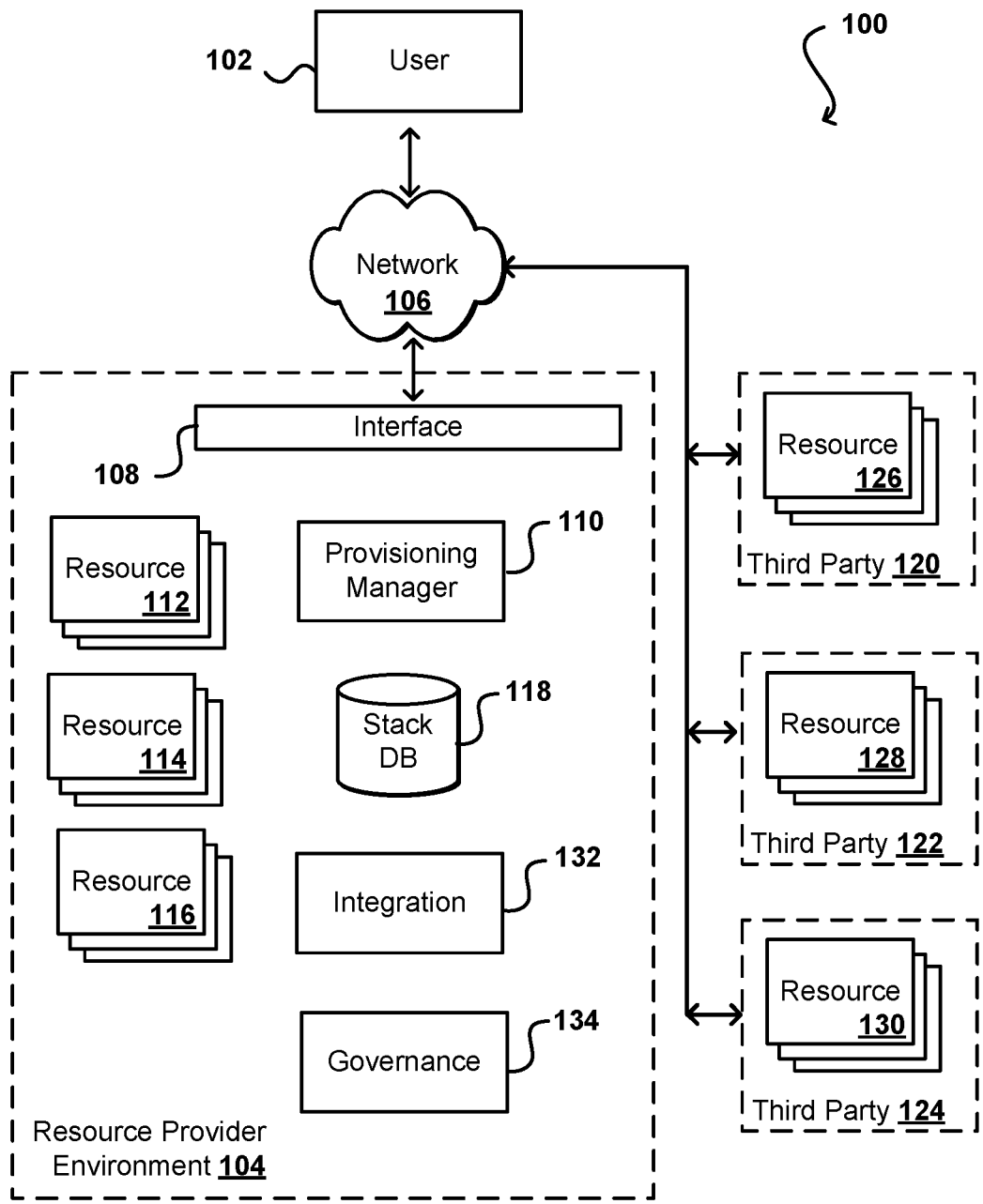
FIG. 1 illustrates an example system for providing cloud resources that can be utilized in accordance with various embodiments.

In many instances, resources, such as cloud resources, virtual resources, serverless resources, locally hosted resources, on-premises environments, combinations, and the like, may be used to host specific applications, which require specific types of connectivity, configuration, and permissions. In certain instances, the applications may be provided by a provider associated with the resources, or by third-party or open-source providers that integrate or otherwise operate with the environment. Users may wish to automate certain functions that provide needed resources within a singular environment, such as computing resources, databases, firewalls, container clusters, and the like. Automation templates may be generated to execute a set of instructions to provision an environment with certain resources or extensions, but these templates may be specific to applications and resources from the provider of the resources. Accordingly, the user may be left to execute custom scripts or commands in order to integrate third-party or open-source resources.

Systems and methods in accordance with various embodiments of the present disclosure overcome one or more of the aforementioned and other deficiencies experienced in conventional approaches to managing aspects of resource sharing and allocation in an electronic environment. In particular, various embodiments are directed toward systems to integrate provisioning logic from third-party or open-source providers for identification and access by users within a resource provider environment. As a result, users no longer need to develop custom provisioning logic for each resource and manage the logic within a private registry. Furthermore, users are no longer burdened with testing the logic, provisioning testing environments which may be counted against their resource allocations, or with learning tooling for each vendor and open-source solution they implement within their environments. Systems and methods may provide a common repository for users to search, review, customize, and enable one or more sets of provisioning logic within automation templates, thereby providing access to various resources, extensions, modules, or the like through an automated system.

One or more embodiments may be directed toward providing a public repository for users to search for and enable various resource types (e.g., a code package containing provisioning logic enabling lifecycle management of the resource). Resource types may contain a schema, which defines the shape and properties of a resource, and the necessary logic to provision, update, delete, and describe a resource. Accordingly, users may have access to ready-made resource types for a variety of native and third-party or open-source applications and resources.

Various systems and methods may enable third-party vendors and users to submit provisioning logic within the repository. The logic may be associated with a verified publisher (e.g., a user submitting one or more code packages with an account associated with the resource provider environment and one or more additional accounts), tested within a testing environment to determine whether one or more portions execute in an expected manner, receive a score (e.g., pass, fail, pass with restriction, etc.), and then receive publication when the score exceeds a threshold or level. As a result, third-party vendors may encourage use of their extensions and applications by providing the provisioning logic to simplify the tasks for their customers. Additionally, users may contribute provisioning logic to the community.

Various other applications, processes, and uses are presented below with respect to the various embodiments.

FIG. 1 illustrates an example system 100 that can enable a user 102 (e.g., a client operating on a client device) to obtain access to resources provided as part of a resource provider environment 104. These resources can include physical and virtual resources that may be located at one or more locations controlled by the provider or a third-party, or may be located on a location controlled by the user, or an entity with which the user is associated. In this example, a user can utilize the client device 102 to access resources of the resource provider environment 104 over one or more networks 106. The client device 102 can include any appropriate electronic device operable to send and receive requests, messages, or other such information over an appropriate network and convey information back to a user of the device. Examples of such client devices include personal computers, tablet computers, smart phones, notebook computers, and the like. The network(s) 106 can include any appropriate network, including an intranet, the Internet, a cellular network, a local area network (LAN), or any other such network or combination, and communication over the network can be enabled via wired and/or wireless connections. The resource provider environment 104 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 104 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 104 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the resource provider environment 104 can correspond to an Amazon Web Services (AWS) environment, where a user may be a customer having an AWS account. In such an implementation, various additional monitoring and management services may be provided, such as AWS CloudFormation and AWS Systems Manager (SSM), which can use resource capacity from, for example, Amazon Simple Cloud Storage Service (S3) to provision resources for a resource stack in the customer account. In at least one template, templates in such an implementation can then be CloudFormation templates, and a Launch Wizard Manager can be an Amazon AppWizard manager.

In this example, a request to the resource provider environment 104 can be received by an interface layer 108 of the environment. As known for network environments, the interface layer can include components such as interfaces (e.g., APIs), load balancers, request and/or data routers, and the like. In various environments, the request may be to provision an environment for user which may include a variety of different resources, applications, extensions, and the like. A provisioning manager 110 may evaluate the request and determine the availability of one or more portions of the request, such as determining whether the user's account level supports items within the request, whether sufficient resources are available, and the like. By way of example only, the provisioning manager 110 may enable generation of a computing environment that includes one or more of resources 112, 114, 116, which may correspond to items such as compute resources, databases, firewalls, container clusters, machine learning systems, and the like. For example, the provisioning manager 110 may, upon receipt of the request, establish an environment that utilizes a certain level of computing resource, has access to one or more databases, and executes one or more extensions or applications. In various embodiments, the provisioning may be accomplished using a template that has one or more sets of instructions to facilitate execution and utilization of the environment without the user providing and forming separate instructions each time. In various embodiments, these templates may be retrieved from a template database 118, which may include the instructions for provisioning various stacks on request from the user.

In various embodiments, the client 102 may desire to add functionality that may be hosted or otherwise provided from one or more third parties 120, 122, 124. For example, the third parties may include open-source resources or subscription services, such as container orchestration systems, database programs, scale monitoring services, or the like. The resource provider environment 104 may authorize integration of these services in order to provide an improved experience for the client 102, however, may not natively support deployment and management of these third-party systems. For example, resources 126, 128, 130 from the third parties 120, 122, 124 may be evaluated by an integration manager 132 to ensure compliance with one or more operating parameters, such as security parameters. A governance manager 134 may further integrate with the services to provide the users with tools to meet compliance and government requirements for their applications, even those from the third-party sources.

However, even if the resource provider environment 104 enables use of these services, the user provides the necessary scripts and commands for deployment and provisioning. By way of example, users may develop custom provisioning logic for each resource and manage them in a private registry. This requires customers to learn the tooling for each third-party or open-source solution, and they have to keep the provisioning logic updated with the latest third-party or open-source implementation. While some third-party and open-source developers provide provisioning logic for their resources, it may be difficult for customers to find and effectively use. Additionally, the logic may not follow best practices for the resource provider environment 104. As a result, the user may manage internal sets of scripts and code, which may be prepared in a variety of languages, as well as periodically updating and patching the code as changes are made to the software. Some users may not have the capability of preparing the code themselves, and even if the third parties provide templates, the user is still responsible for identifying the code portions, preparing the commands for execution at the resource provider environment 104, and tracking changes to their implementations.

Embodiments of the present disclosure may integrate third-party applications to execute along with native applications provided by the resource provider environment 104 (e.g., established operations prepared by the provider). The provider may give access to tools that enable provisioning and management of resources, such as compute infrastructure, monitoring tools, and databases. Management of these tools, by the provider, provides a consistent and scalable way of provisioning and managing applications. Systems and methods of the present disclosure provide these same benefits when utilizing third-party or open-source technologies to provide a consistent and scalable way of provisioning these additional resources with user applications. In one or more embodiments, the resource provider environment 104 may establish and/or maintain a public registry that enables users to leverage provisioning logic from third-party and open-source sources from a central, managed location. This provisioning logic may be submitted to the resource provider environment 104, tested for security and compliance, and then published for use. As a result, provisioning of these third-party and open-source resources may be automated and formatted into templates, just like the native resources within the resource provider environment. In one or more embodiments, the provision logic may be referred to as an extension that can be enabled and integrated to function with the templates. It should be appreciated that additional functionality, such as support of modules and hooks, may also be provided. Modules encapsulate best practices and abstract away the complexity of building on and integrated different services and providers. Hooks allow customers to proactively enforce best practices and compliance. In various embodiments, the hosted public registry may function to manage permissions, maintain consistent versioning, package hosting, implement updates, and natively integrate the applications with other services provided by the resource provider environment 104.

Figure 2:
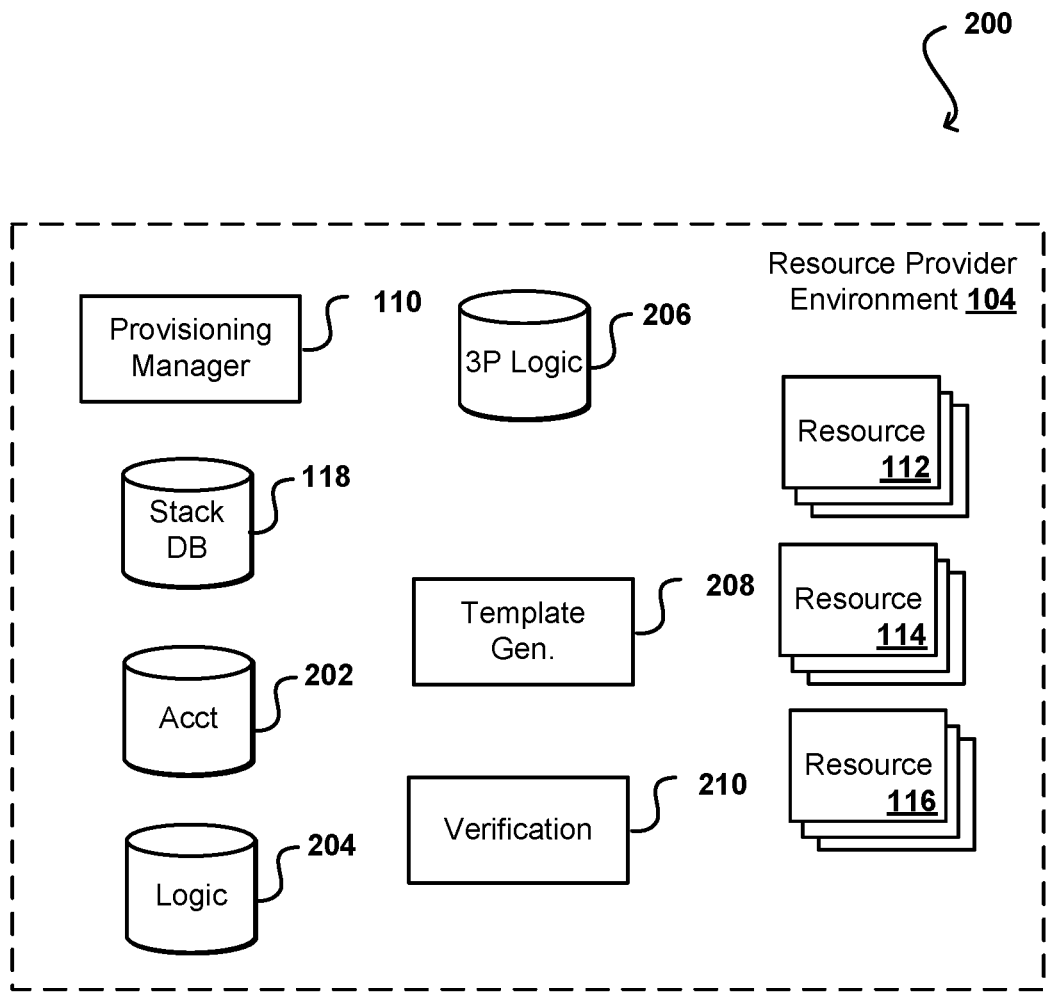
FIG. 2 illustrates an example system for providing extensions and provisioning resources in a user cloud account that can be utilized in accordance with various embodiments.

FIG. 2 illustrates an example system 200 that can provide a public registry to enable users to execute and provision resources, modules, and/or applications from third-party or open-source providers. In this example, the resource provider environment 104 includes the provisioning manager 110, the resources 112, 114, 116, and the stack database 118 as described above. It should be appreciated that various other components may also be included, or hosted separately in a different environment, and are not shown for clarity with the following discussion. Furthermore, these components are shown by way of example and are not intended to limit the scope of the present disclosure, as like numerals are being used for convenience and not by way of limitation or exclusion.

In this example, a user may submit a request or query to provision a set of resources. The user's request may be evaluated against an account database 202, which may include information regarding the user's permissions for access to various resources, and the like. Upon verification of the user's permissions or a status of the user with respect to the resources, the provisioning manager 110 may access the stack database 118 to locate a template or set of instructions associated with the user. Alternatively, the user may provide individual instructions or the template along with the request. Additionally, in embodiments, the request may be an instruction to execute a particular template within the stack database 118. The provisioning manager 110 may then execute the logic within the template to provision various resources.

In certain embodiments, the user's templates or instructions include resource types (e.g., scripts or provisioning logic) extracted from one or more logic databases 204. In certain embodiments, different sets of resource types within the template may be referred to as extensions that are incorporated or enabled within the template. The logic databases 204 may correspond to private or public registries that include executable instructions that the user may select and incorporate into their templates or sets of instructions. For example, a native logic database may include instructions for provisioning resources, applications, or services provided by the resource provider environment 104, such as the resources 112, 114, 116. In at least one embodiment, the logic database 204 may be associated with a cataloged and searchable service that the user can access, identify relevant logic for their desired task, and then select that logic for execution without formally writing or preparing the logic themselves. Such an arrangement may encourage the use of the resources within the service and also improve the user experience while also reducing costs associated with developing the logic, maintaining the logic, updating the logic, and the like. The provisioning manager 110 may begin to execute the instructions within the template, recognize one or more identifiers associated with logic within the logic database 204, query the logic database 204 for the appropriate executable code, and then proceed with executing the code. Additionally, in various embodiments, the code may also be stored within the template itself, for example embedded within the extension, thereby reducing or eliminating the need for the provisioning manager 110 to query the logic database 204.

As noted above, the user may also wish to include provisioning logic for various third-party or open-source resources, but may not want to develop their own provisioning logic and/or maintain their own provisioning logic. Additionally, even if the user does develop their own logic, they may not wish to maintain the logic within a private registry that is then separately queried, managed, and hosted. Accordingly, systems and methods of the present disclosure may include a public third-party repository 206 that stores provisioning logic (e.g., resource types, extensions) for third-party or open-source applications that the user may implement into automated templates. For example, when establishing templates, for example using a template generator 208, the user may be presented with potential executables (e.g., extensions, modules, hooks, applications, etc.) that are provided from the logic database 204 and the third-party repository 206. The user may select various executables for inclusion with their templates, which when executed by the provisioning manager 110, may automatically provision an environment or one or more resources or applications within the environment with a pre-set configuration.

In this example, a verification system 210 may be used to evaluate the provisioning logic provided by third parties prior to inclusion within the third-party repository 206. The verification system 210 may include one or more processes, such as a credential verification, a code verification, a testing environment, a testing API, a score generator, and the like to verify that provided provisioning logic will execute as expected and conform to one or more properties or configurations of the resource provider environment 104. By way of example, the verification system 210 may verify that a user providing the logic is a verified user, associated with an account or a third-party provider, and that the user is authorized to submit the logic for review. In other words, the user may be evaluated to determine whether the user has an account associated with the resource provider environment 104 and one or more additional verified accounts, such as accounts associated with a marketplace of the resource provider environment, a trusted third-party source, a trusted code bank or depository, or the like. In this manner, the user may be evaluated in terms of whether they have permissions associated with the resource provider environment and also to provide additional information that may enable one or more other users to verify their competency or activity with respect to the logic. For example, the user may have a linked account with an associated code repository, and upon providing logic to the resource provider environment 104, the logic may be associated with the linked account to enable one or more users of the logic to verify the capabilities or activity of the verified user. Furthermore, the verification system may provision a testing environment to run the logic to check for any instances or malicious code or unexpected behavior. As an example, different handlers (e.g., an invocation of create, update, delete, read, or list action on a resource instance) within the logic may be evaluated for expected behaviors. The steps of the logic may then be assigned a score, which may be a pass/fail or a numerical score, where a score above a threshold is approved and then published to the repository 206.

Accordingly, embodiments of the present disclosure may provide users with a public repository to browse and use supported resources from third-party or open source providers. This configuration enables users to manage third-party resources alongside natively hosted resources while receiving the benefits of automation such as safety, consistency, and scalability provided by the resource provider environment 104. Systems and methods may be associated with providing improved automation services for provisioning resources. Additionally, systems and methods may be associated with providing the functionality in an easy to access format such that users are not burdened with developing, testing, and managing their own extensions.

Figure 3:
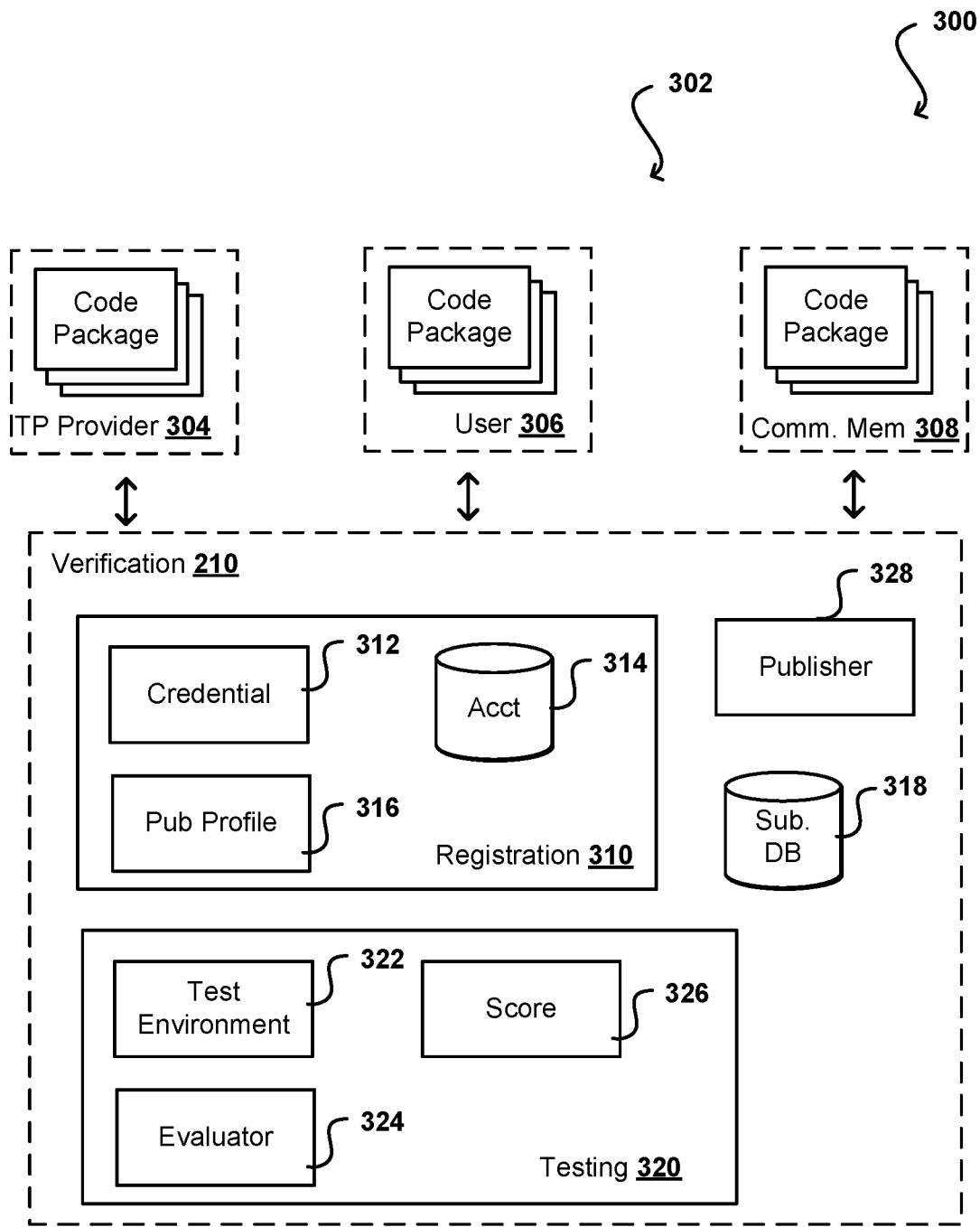
FIG. 3 illustrates an example system for verifying and authorizing publication of public extensions in a resource provider environment that can be utilized in accordance with various embodiments.

FIG. 3 illustrates a system 300 for addition and verification of extensions (e.g., provisioning logic) from third-party sources to the resource provider environment 104. In this example, a variety of sources 302 may submit logic for inclusion in a public repository. This logic may be associated with one or more software-defined and uniquely identifiable components with a set of properties and associated values, which may correspond to one or more resources such as computing instances, buckets or storage containers, resource monitors, pods, clusters, or the like. In various embodiments, the sources 302 may submit a code package containing provisioning logic to manage a lifecycle of one or more resources. The code package may enable operations such as creation or deletion, among others, to abstract away complex API interactions. Moreover, the code package may contain a schema, which defines the shape and properties of the resource, along with the necessary logic to provision, update, delete, and describe a resource. Furthermore, in one or more embodiments, the schema may further include information regarding dependencies, for example for separately hosted resources, such as resources within another provider environment, on premises resources, and the like.

The illustrated embodiment includes different types of sources 302, such as a third-party provider 304, a user 306, and a community member 308. The third-party provider 304 may be associated with one or more services being integrated and utilized with the resource provider environment 104, and therefore may have an incentive to provide the provisioning logic to encourage the use of their products. The user 306 may be one or more users within a larger ecosystem that willingly contributes their provisioning resources for the benefit of other users. In this example, the community member 308 may be an interested party, such as a user from a related forum or code repository, or a hobbyist that also desires to improve the functionality and usability of the various third-party or open-source resources being used. It should be appreciated that various other sources 302 may also provide their code packages, such as internal developers of the original provider. Additionally, in certain embodiments, one or more sources 302 may contribute provisioning logic and be compensated when users select their logic for inclusion within their templates.

In one or more embodiments, sources 302 wishing to submit their own software packages may be registered with the resource provider environment. For example, the verification system 210 may include a registration module 310 for receiving requests from users to act as a contributor or publisher to the community. The registration module 310 may refer to one or more sets of components or algorithms that may be logically executed in order to perform a task. For example, instructions stored on computer-readable media may be executed by a processor and logically implemented to perform one or more tasks. In an example, the registration module 310 may include a credential system 312 for access and credential verification. For example, the user (e.g., submitter, requestor, source) may be associated with an account of the resource provider environment, which may be stored or accessible through an account database 314.

Credential verification may include successfully completing one or more challenges associated with the user account, such as submitting credentials, answering security questions, or linking third-party accounts to the service. In one or more embodiments, credential verification may include providing proof or access to two or more accounts, where one account is associated with the resource provider environment and another account is associated with a third-party service or some trusted service, which may be linked for the purposes of submitting code packages. For example, the user may have an account with the provider and may also have an account and be active on an associated third-party or linked service, such as a code repository and collaboration space, such as GitHub® or BitBucket®, among various other sources. Accordingly, the user's account with that service may be utilized to verify the user to enable submission of code packages for testing and publication. By way of example, upon logging into their associated account with the provider, the user may be asked for information to establish a connection with the third-party service, such as by providing credentials for the third-party service. A connection may be established to validate the credentials and then link the user's local or resource account with the third-party account. It should be appreciated that code repositories and collaboration spaces are provided by way of example only and are not intended to be limiting. Moreover, new verified third parties may be added for verification procedures. Additionally, over time, older verification accounts may be removed. In another example, the user may have an associated account with a marketplace or other service provider, and as a result, the user may also or alternatively link that account for verification. Accordingly, verification for users may be considered as extensible where new methods can be developed and added.

In various embodiments, a publisher profile 316 may be generated to associate certain code packages with the publisher (e.g., user providing the code), provide links or ways to access other projects associated with the user, and provide information such as a rating, an intent to maintain the code, and the like. In this manner, users can receive information that may inform their decision of whether or not to implement the third-party submission within their templates. In an example, a verified user may link their account with an associated code repository. Prior to utilizing the code packages, other users may follow a link, which may be provided with the code package, to the associated code repository to evaluate and analyze other projects associated with the verified user. The users may then determine whether they want to use the code package. For example, a highly involved user with many projects and a long history of activity may be indicative of higher quality than a new user without any projects. Accordingly, linking accounts may provide additional or alternative ways to verify code packages and their providers prior to selection and incorporation by users. It should be appreciated that, in one or more embodiments, a ranking or grade may be assigned to one or more verified users, which may be based, at least in part, on information associated with the third-party or marketplace account. For example, a "power user" may be ranked higher than a new user. Additionally, a marketplace seller with many projects and positive reviews may be ranked higher than a new seller. However, in other embodiments, the existence of the linked account may be sufficient for verification and no ranking or evaluation of the publisher is provided.

In at least one embodiment, submitted code packages are stored within a submission database 318 prior to testing. For example, the users may upload the code for temporary storage and updating prior to full execution of a test. In other embodiments, the code packages, upon verification of the user credentials, may be directly submitted to a testing module 320. In one or more embodiments, the verified user packages or otherwise prepares the code packages and uploads them for review. In at least one embodiment, the code packages may be hosted with another service and the verified user may provide a link to enable access of the code packages. The submission may include original code packages or patches/updates to existing code packages, where an identifier may be provided to indicate whether a patch or update is a major or minor update. Minor updates may then be automatically pushed, upon successful completion of testing, while major updates may, upon successful completion of testing, prompt a notification to users that have enabled extensions associated with the code package. The testing module 320 may provision an environment to enable testing in a separate, secure, server-side environment. As a result, the provider can regulate and control aspects of the testing. Additionally, the submitter is not utilizing their own resources for testing.

A test environment generator 322 may provision a testing environment having one or more standard or set configurations determined by the provider. For example, the test environment may be configured to operate with different versions of software or applications, different resource requirements, and the like. In various embodiments, code packages may have a minimum set of satisfactory requirement with respect to resource use or configurations, and as a result, the test environment may serve to block or otherwise identify code packages that fail to meet the minimum operational standards. An evaluator 324 checks one or more aspects of the code packages. For example, as noted above, different handlers may be executed and their resulting operations may be compared against an expected result. In other words, the evaluator 324 may determine whether there is consistency in operations for different handlers. In various embodiments, there may be resource dependencies associated with the code packages. Accordingly, the verified user may provide inputs associated with those dependencies to identify which information is passed to the code package. Moreover, in one or more embodiments, the code packages may be associated with one or more actions with resources that are outside of the resource provider environment, such as provisioning a separately hosted cloud service, by way of example only. Additionally, code packages may be utilized to provision combinations of both external (e.g., outside of the resource provider environment) and internal (e.g., within the resource provider environment) resources. In one or more embodiments, the schema associated with the code packages may include deep resource definitions to enable provisioning resources outside of the resource provider environment.

In one or more embodiments, the evaluator 324 may evaluate various handlers, where an input is passed in and the handler passes back one or more outputs. The evaluation, in various embodiments, is an evaluation of the one or more outputs based, at least in part, on the input. Accordingly, the evaluator 324 may be utilized to determine whether the one or more handlers, present within the provisioning logic associated with the code package, behave as expected, for example based on a contract or set of rules associated with the one or more handlers.

The evaluator 324 may also scan portions of the code for the presence of known malicious code, such as code that is on a "blocked" or "not allowed" list. The code packages may then be scored 326. The score may be combination of factors, such as how many tests the code passed, how the code performed against benchmarks, or the like. In various embodiments, the score is a binary decision, such as pass or fail, where code that fails is not allowed to be pushed to the public repository and code that passes is. In other embodiments, the code is numerically scored where a threshold score enables publication and a score below the threshold does not. In at least one embodiment, the score may be provided to users that are using the public repository to provide information regarding aspects where the code may or may not perform as expected or as well as other code, thereby providing the users with more information to make an informed decision.

A publisher 328 may push or otherwise direct code packages that have passed the testing to the public repository. Additionally, the publisher 328 may also provide a notification to the source 302 regarding the status of their submitted code packages, where the source may be informed of a passing score and provided with information regarding publication and availability. In one or more embodiments, the publisher 328 may also provide information regarding failed tests and notices of non-publication. Accordingly, verification of code packages may be performed, by the provider, prior to inclusion in the public repository. Such a system enables the provider more control to ensure that code packages will operate within the environment to improve user experiences and make it more likely that the users will use the system.

FIGS. 4A-4D illustrate an example interfaces for user interaction with searching for, identification of, selection of, and implementation of one or more extensions, modules, code packages, provisioning logic, or the like. In this example, a search interface 400 is provided within an extension registry 402, which may correspond to one or more databases described herein that stores extensions or code packages. In at least one embodiment, users can interact with features of the search interface 400 to identify different extensions that may be integrated into their templates to automatically provision resources to generate one or more stacks.

In this example, a search box 404 enables a user to enter one or more query terms. The query terms may include a resource type, a specific provider, a specific publisher, or the like. The user may submit the terms and then receive a list of results 406, which may be further refined with one or more filters 408. As a result, the user can identify specific types of extensions they wish to use. By way of example, the user can filter through to identify only publicly available extensions and may further choose levels of verification, ratings, scores, and the like.

In this example, three different extensions 410, 412, 414 are provided within the results 406. Each extension 410, 412, 414 includes information that may be used by the user to identify and select appropriate extensions for their needs. For example, the resource type may be identified, along with a resource name, identification of the publisher, and information regarding the score or whether the code package has been verified. As a result, the user may search through different extensions to identify ones suitable for their needs from reputable publishers. In the illustrated example, the extension 410 is a public extension published by Open Co. The extension relates to monitors and is shown as being enabled by the user. For example, the user may include this extension in one or more templates they are currently executed. The extension 412, on the other hand, is not enabled. This extension 412 is also a public extension, but it is for a Cluster A Cluster and is published by User A. As shown, the user is not the provider of the application associated with the extension 412, however, the extension 412 is still verified and indicates a passing score. In the example, there are no extensions with failed scores because the provider may not want users enabling code packages that will not work, which could potentially cause vulnerabilities or create frustration for the users.

In various embodiments, users may select or otherwise hover over different regions to obtain additional information, for example within a pop up window 416. In this example, additional information is provided with respect to the verification of the extension 414. For example, the user may be described as an active user. This additional detail may provide more confidence for others to implement the solutions, thereby simplifying their experience with the provider.

Figure 4A:
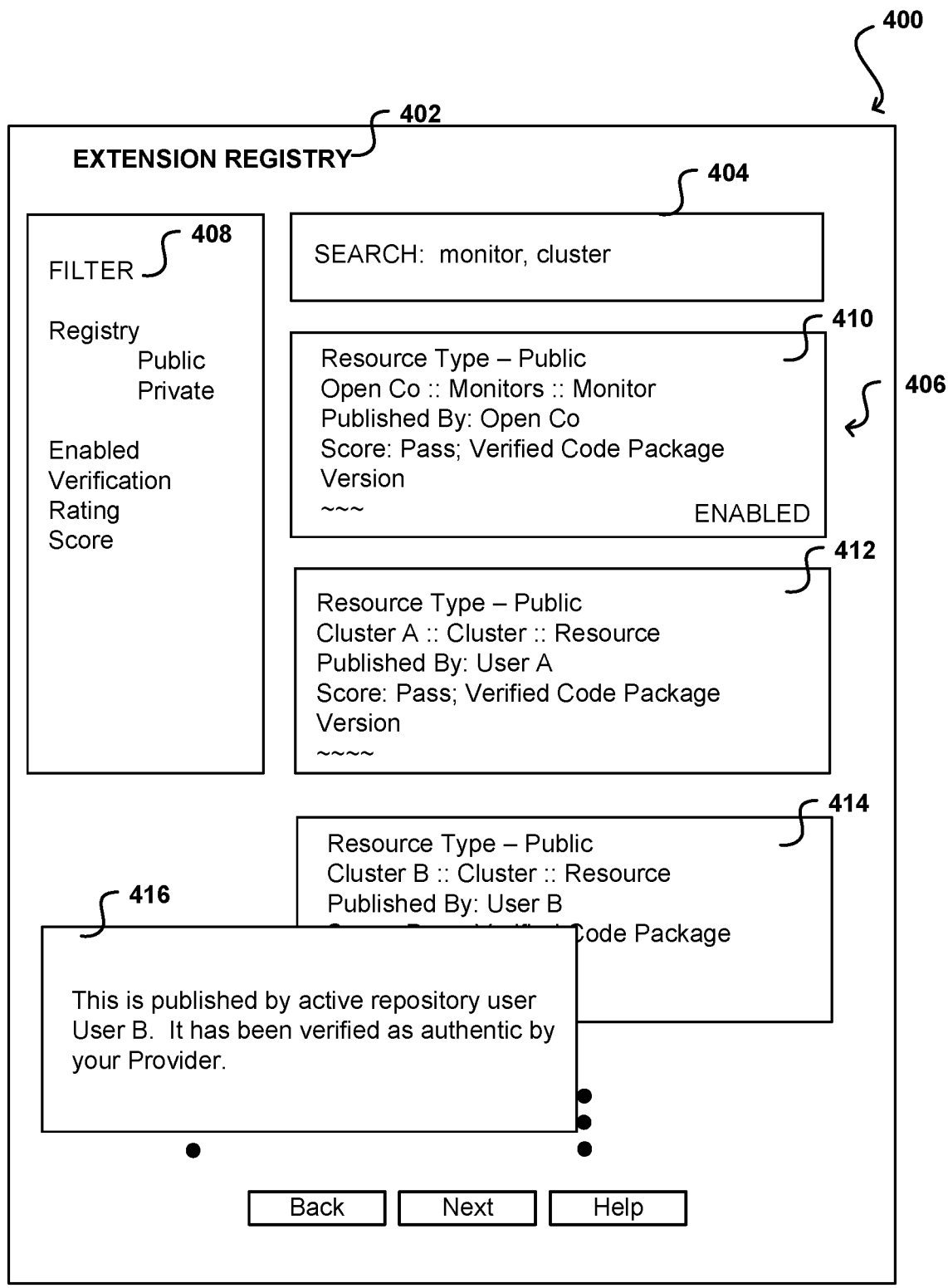
FIGS. 4A-4D illustrate example console displays that can be utilized in accordance with various embodiments.
Figure 4B:
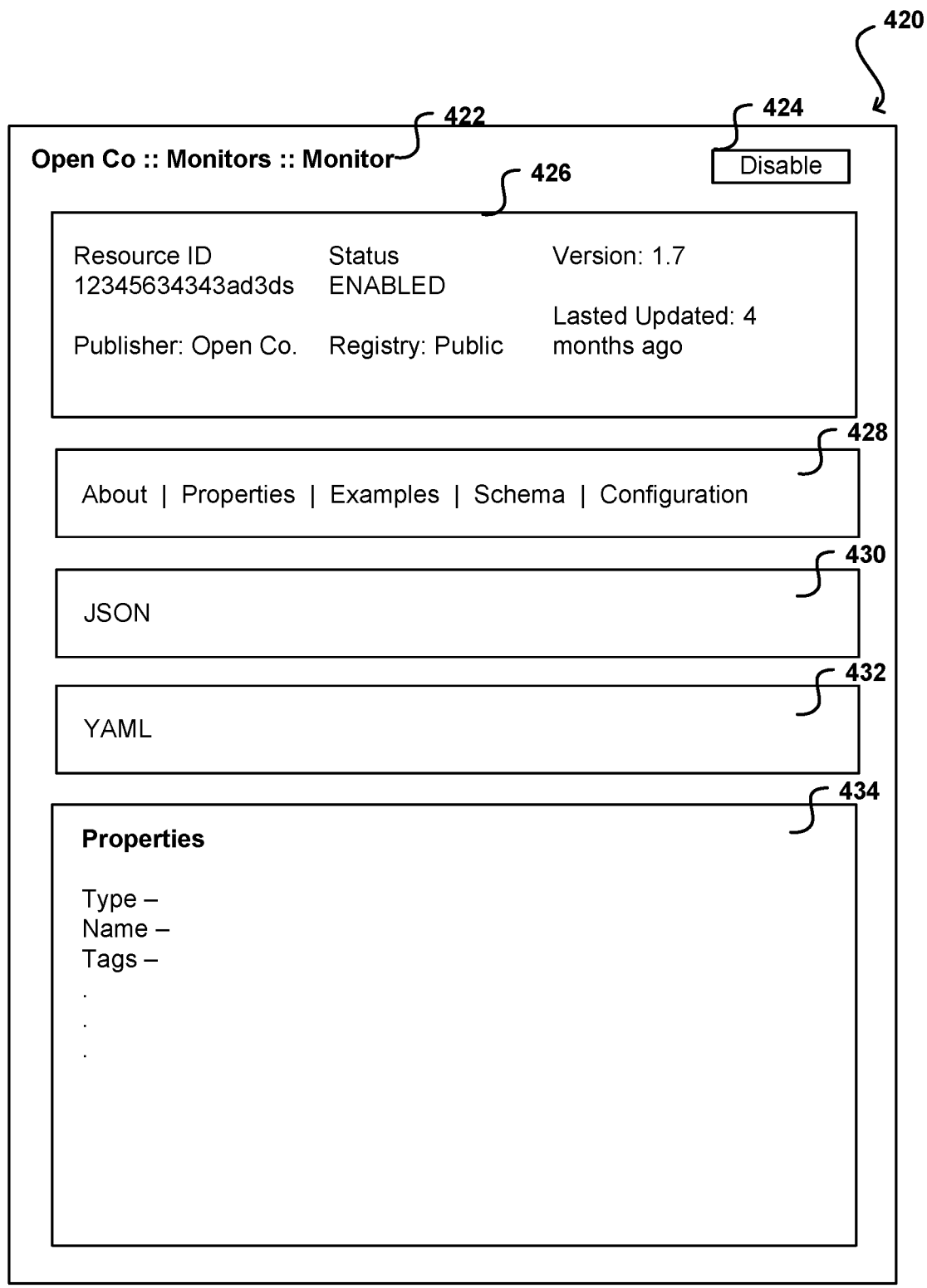

FIG. 4B illustrates a detail interface 420 including information for an extension 422 after selection by the user. The illustrated interface 420 provides a button 424 for enabling/disabling the extension after review by the user. For example, the user can choose to enable the extension for operation within their environment, but may still need to add the extension to specific templates, as will be described below.

In this example, an information panel 426 is provided for the user to quickly identify and recognize potentially relevant information, such as an identification for the extension, publisher information, registry information, version information, and the like. Additional selectable interface elements may include a navigation 428, JSON panel 430, YAML panel 432, and properties panel 434. Each of the panels, when selected by the user, may be utilized to receive information about the extension to enable the user to review the extension and determine whether it would be applicable and satisfactory for their needs. Such a layout simplifies the process for the user, as opposed to searching through a variety of online code repositories or forums to identify code sections that may or may not fit their needs and be acceptable within the resource provider environment.

Figure 4C:
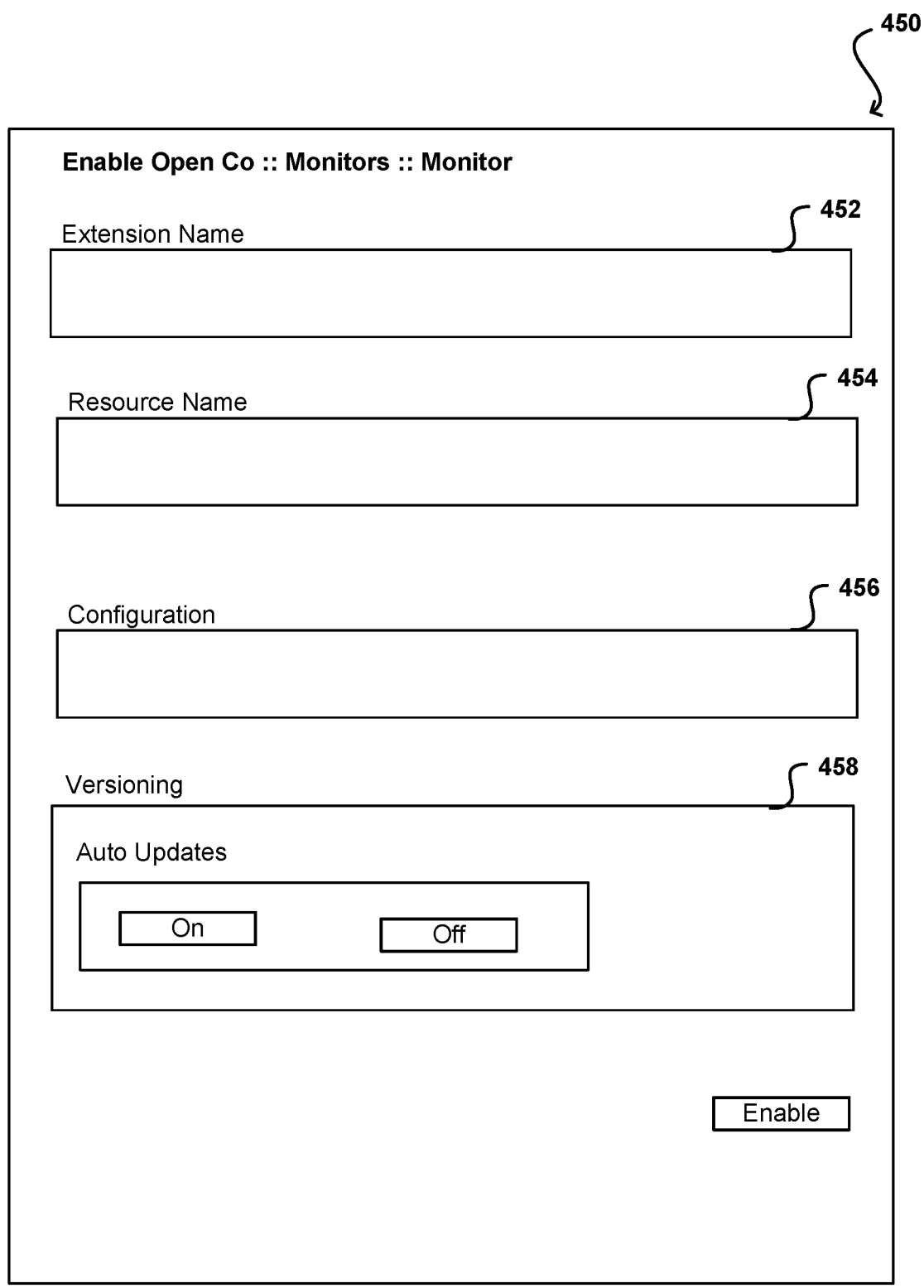

FIG. 4C illustrates an enabling interface 450 that may be used with embodiments of the present disclosure. In this example, the user is prompted to provide identification information, such as a short name or alias 452 for the extension, a resource name 454 for the one or more resources associated with the extension, and configuration information 456, such as specific logging configuration information. This may enable the user to maintain an organized set of instructions for this templates and quickly identify which extensions or features to enable or disable. Furthermore, the user may include notes or other information for different users within the organization.

Various embodiment also providing versioning support 458 for the one or more extensions. For example, the user may choose to opt into automatic updates where the extensions are updated as the publisher provides a new version. The updates may undergo similar testing as the initial publication of the extension, thereby providing the user confidence that the updates will maintain functionality with their services.

Figure 4D:
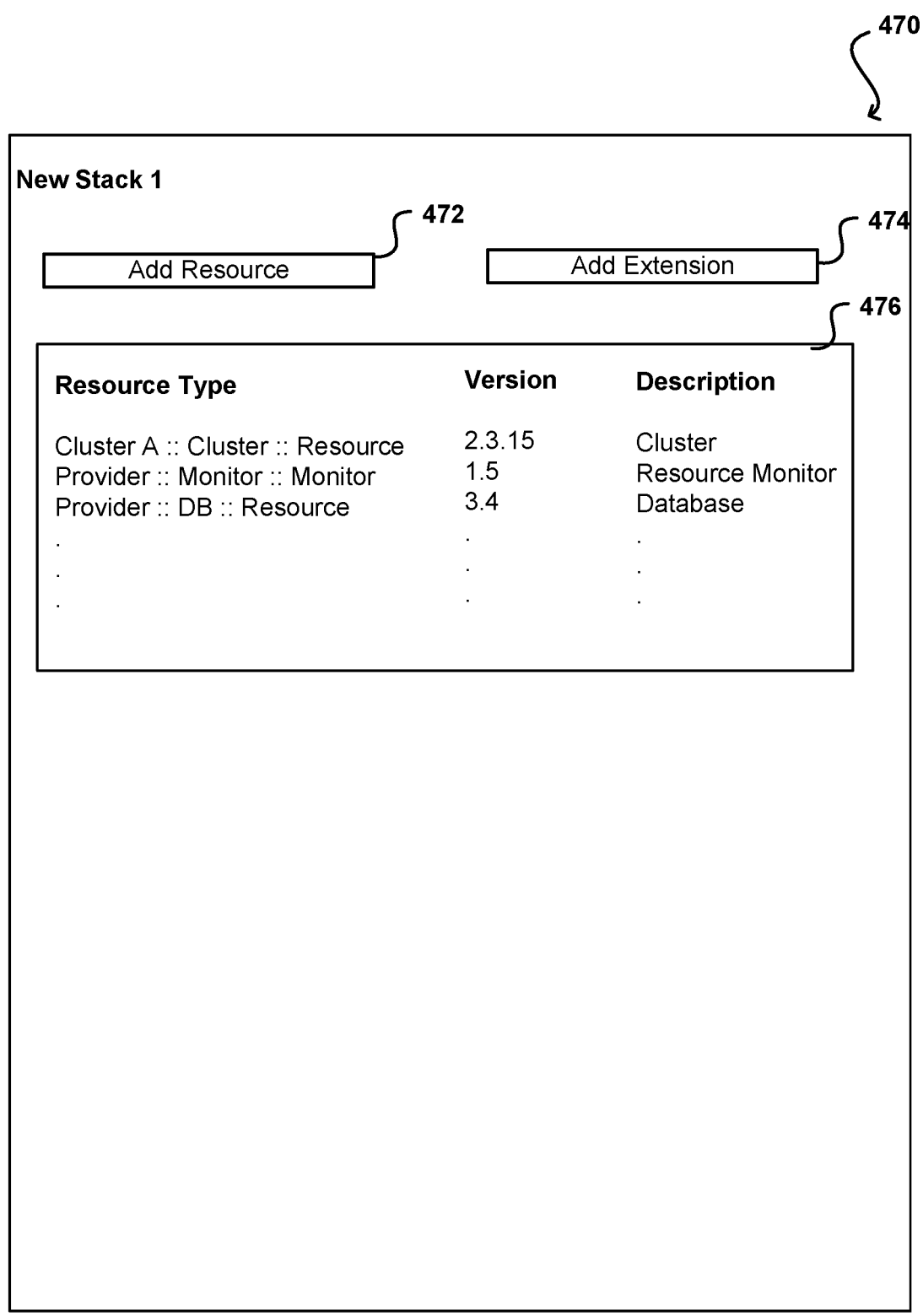

FIG. 4D illustrates a stack builder interface 470 which may be used with various embodiments of the present disclosure. In this example, the user is provided with a listing 472 of their enabled extensions for addition to one or more stacks. It should be appreciated that these enabled extensions may be pre-configured or may be prompted for configuration with the stacks and/or various resources associated with the stacks. By way of example, configuration may include providing information such as an keys (e.g., an API key, an admin key, an access token), an identification of the resources being utilized with the stack, an ordering in which the extension will execute, dependences for the extension, and the like.

In one or more embodiments, interactive elements 472, 474 enable the user to select additions to their stack, such as adding a resource or an extension. It should be appreciated that, in various embodiments, additional or fewer interactive elements may be provided. Selection may take the user to an interface to search for extensions or resources to add, such as that shown in FIG. 4A, and then the user may proceed with the steps to enable the extension. Additionally, in various embodiments, the user may receive a prompt for pre-enabled extensions and then quickly add those to a stack configuration 476. The stack configuration 476 illustrates the various extensions and resources that will be provisioned upon execution of the stack, thereby saving the user time and automating the process or establishing an environment.

Figure 5:
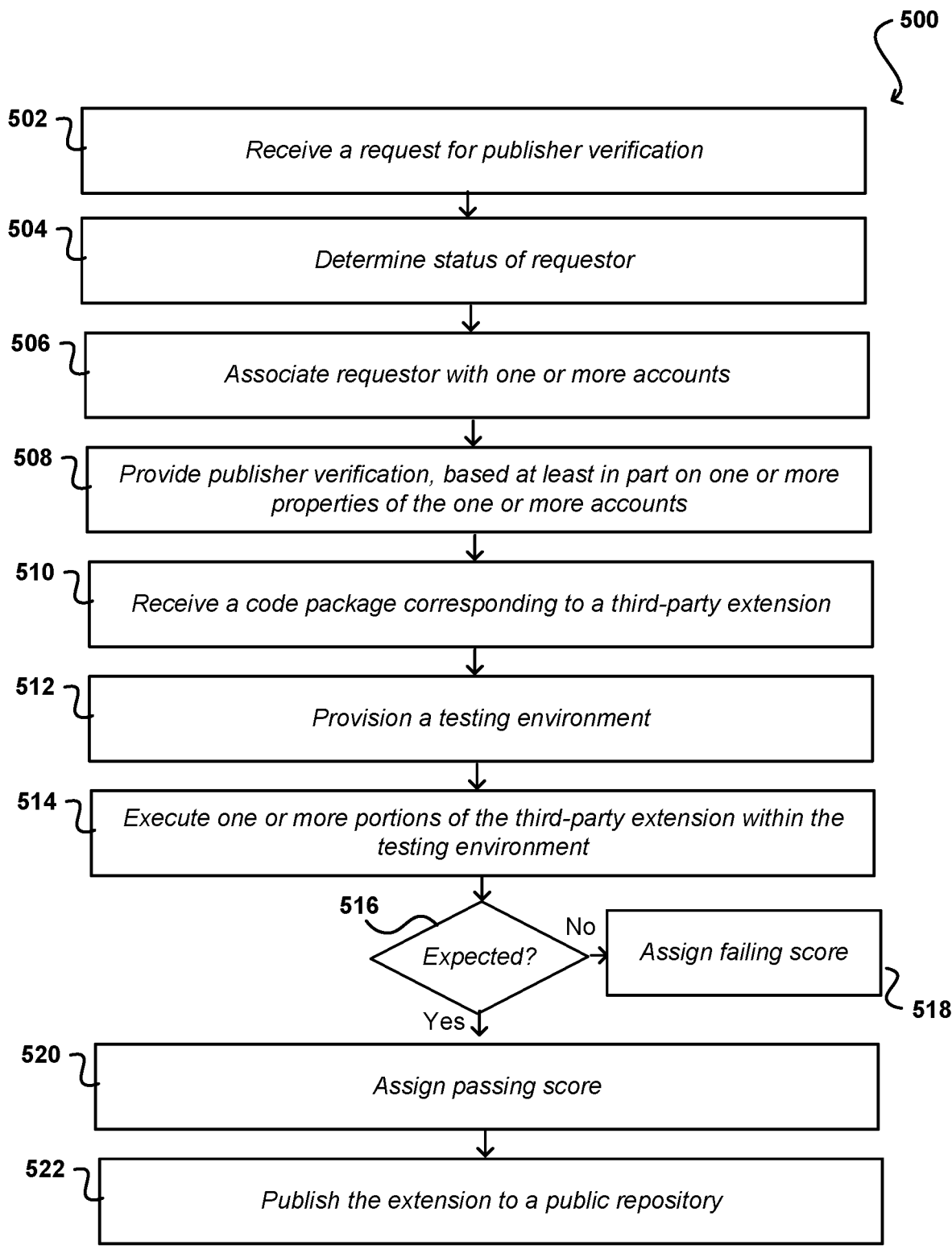
FIG. 5 illustrates an example process for verifying and publishing an extension for a resource provider environment that can be utilized in accordance with various embodiments.

FIG. 5 illustrates an example process 500 for third-party extension submission that can be utilized in accordance with various embodiments. It should be understood that there can be additional, fewer, or alternative steps performed in similar or alternative orders, or in parallel, within the scope of the various embodiments unless otherwise specifically stated. In this example, a request is received 502 for publisher verification. In some embodiments, this request may be received from a user or a third-party to enable submission and publication of one or more extensions for us with a third-party or open-source application or resource. The request may include information associated with the requestor, such as log in information, credentials, and the like. The requestors permission status is determined 504, for example using the log in or verification information. In at least one embodiment, the requestor is associated with one or more accounts additional accounts 506. The one or more additional accounts could include linked accounts in addition to an account with a resource provider environment. By way of example, the requestor may link another trusted account such as an account with code repositories, marketplaces, or message boards, among other options. Additionally, the one or more accounts may also be associated with a verified third-party partner. The resource provider environment may provide publisher verification 508. The request may receive the verification based on one or more properties of the one or more accounts. By way of example, a user that is considered a certain level of user (e.g., a "power user") within a certain message board or forum may receive verification due to how active they are within the forum. Additionally, the one or more properties may be associated with how helpful or prevalent the user is within a community. Furthermore, in one or more embodiments, association with certain trusted third parties may be sufficient to provide publisher verification. Verification may enable submission of code packages for publication and use within a public repository.

In one or more embodiments, a code package is received 510. The code package may correspond to a third-party extension or resource that may be executed within or associated with the resource provider environment. In one or more embodiments, the extension may be used to provision an application or resource for use with one or more code stacks. The extension may provide executable code that enables one or more steps of the provisioning to be automated for simplicity for the associated users. The resource provider environment may wish to test the code to ensure it complies with best practices, is free of malicious code, and functions in the intended manner. Accordingly, a testing environment may be provisioned 512. The testing environment may include a particular set of resources to evaluate execution of the code package. One or more portions of the code package are executed within the environment 514 and evaluated to determine whether one or more handlers or segment behave as expected 516. For example, a handler for a "create" command with respect to a container may be evaluated to determine whether, upon execution, it creates the specified container. In various embodiments, the requestor may provide one or more inputs for testing, for example where dependencies are needed to provision resources in separately hosted environments (e.g., external to the resource provider environment). In at least one embodiment, various evaluations are performed on the output of the handlers, such as determining a final result, a time to complete the task, and the like. If one or more portions do not behave as expected (e.g., in accordance with one or more rules established for the handler), the code package is given a failing score 518 and not published. If one or more code portions behave as expected, the code package is given a passing score 520 and the code package is published to a public repository 522. Accordingly, authorized publishers may submit code packages for testing and verification prior to publication to a public repository, where one or more users may select the extensions to enable stack creation using automated templates that can provision both native and third-party or open-source resources.

Figure 6:
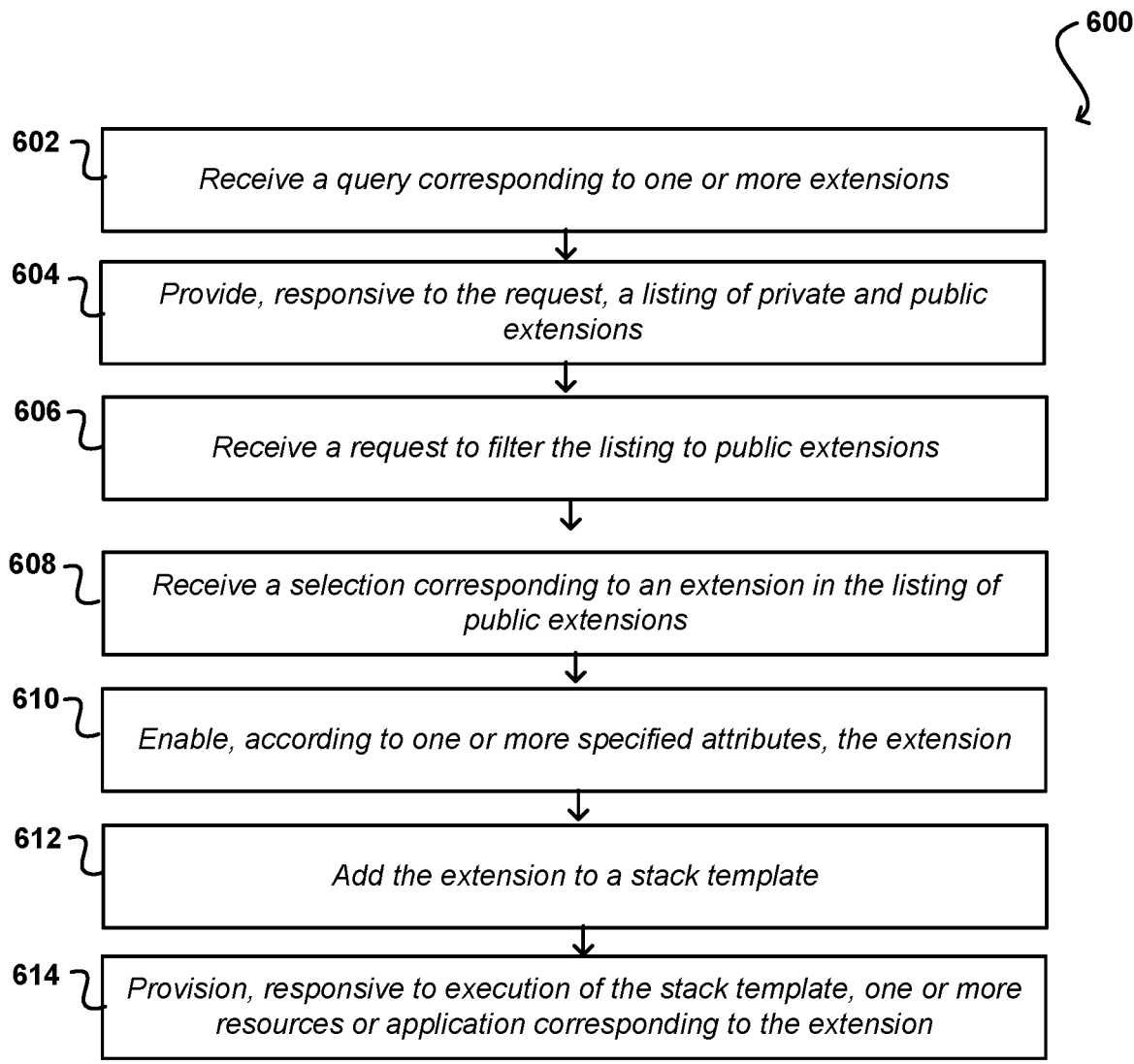
FIG. 6 illustrates an example process for providing and adding an extension to a stack template that can be utilized in accordance with various embodiments.

FIG. 6 illustrates an example process 600 for automatic stack provisioning using one or more third-party or open source resources. In this example, a query is received 602 corresponding to a search for one or more extensions within a resource provider environment. The query may be provided by a user of the resource provider environment for one or more code packages to enable automated stack formation to provision one or more resources or applications upon execution of a template or set of instructions. In at least one embodiment, responsive to the request, a listing of extensions is provided 604. The listing may include both public and private extensions, where the public extensions may include those extensions available to all users (e.g., published for public use) and public extensions may be exclusive to the searcher, for example as being hosted by the user or the user's organization. The user may request to filter the listing 606, for example to only view the public extensions, and select an extension. In at least one embodiment, the selection is received 608 and information is provided to the user to configure the extension. The extension may then be enabled 610 such that the user can add the extension to a stack template 612. Upon execution of the stack template, the extension may be run to provision one or more resources or applications associated with the template 614. In this manner, users can incorporate public extensions into their resource stacks, which may eliminate steps for the user regarding developing custom scripts to incorporate third-party or open-source resources or applications.

Figure 7:
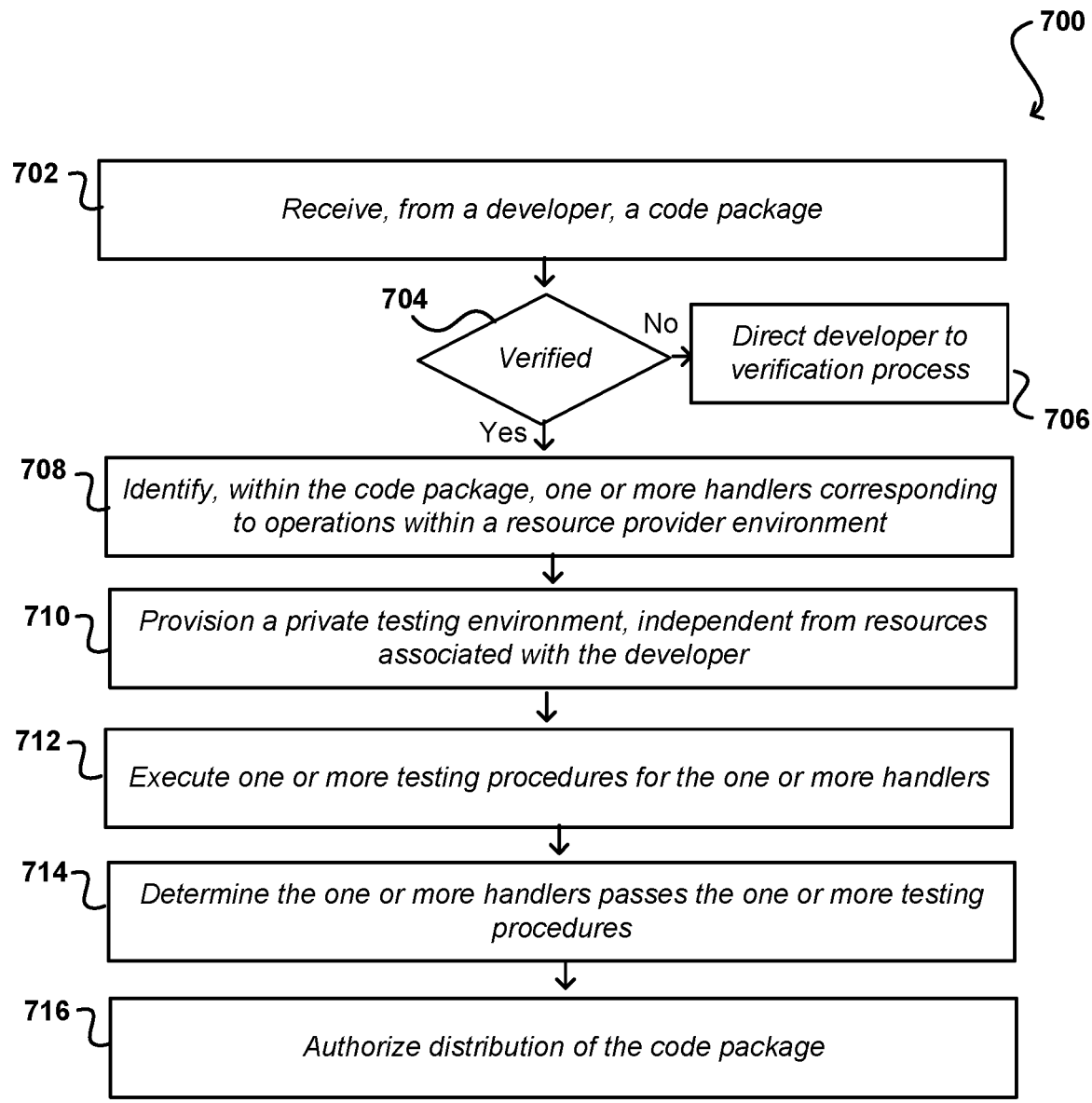
FIG. 7 illustrates an example process for verifying a code package that can be utilized in accordance with various embodiments.

FIG. 7 illustrates an example process 700 for submission and verification of code packages. In this example, a code package is received from a developer 702. For example, the developer may be a user of the resource provider environment or may be associated with a third-party or open-source resource that utilizes the resource provider environment. The code package may correspond to provisioning logic to enable one or more resources or applications to execute within the resource provider environment. In at least one embodiment, the code package is provisioning logic formatted to comply with one or more requirements of the resource provider environment to enable automatic provisioning of resources based, at least in part, on a template or set of instructions received from users. The developer's credentials may be evaluated to determine whether they are a verified developer 704. If not, the developer may be directed toward a verification process 706, where the developer may be permitted to submit and have code packages published if the verification process is successfully completed.

If the developer is verified, one or more handlers within the code package may be identified 708. The handlers may correspond to one or more operations that may be associated with resources of the resource provider environment. A private testing environment may be provisioned 710 to test the code package, such as to test functionality of the one or more handlers, among other portions of the code package. One or more testing procedures may be performed 712 to evaluate how the code performs. For example, the testing procedures may verify that the handlers perform an expected task, check portions of the code against a blocked or malicious code list, or the like. After testing, performance of the code package may be evaluated to determine a score 714. For example, the score may be a pass/fail score where a pass is provided when the code functions as expected and a fail is provided if one or more portions of the code do not function as expected. Additionally, the score may be a numerical score, which may be provided on a scale. The numerical score may also be correlated to a pass/fail designation, where a score exceeding a threshold is considered passing and a score below the threshold is considered failing. Upon determination of a passing score, the code package may be authorized for distribution 716.

Figure 8:
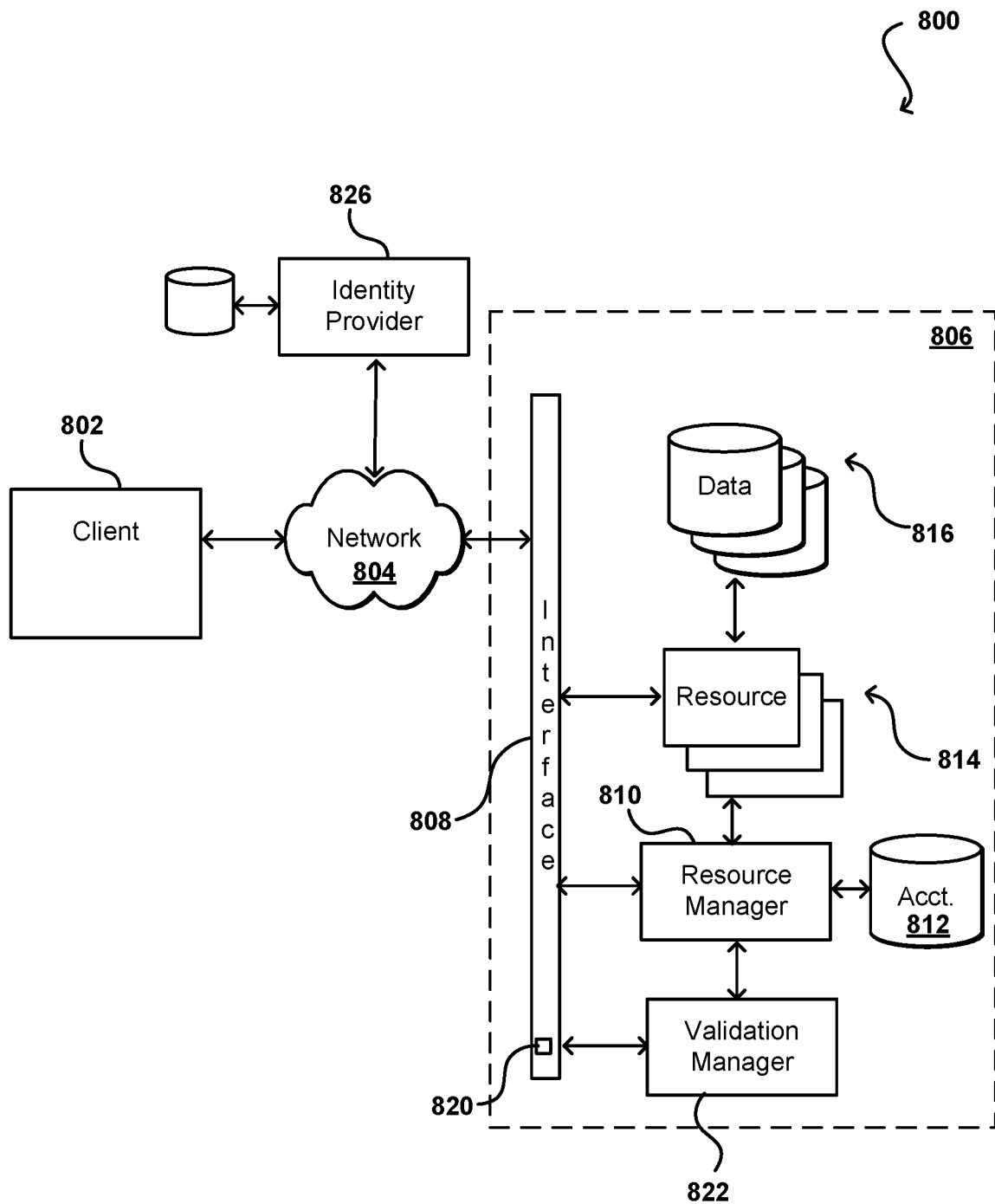
FIG. 8 illustrates an example environment in which aspects of various embodiments can be implemented.

FIG. 8 illustrates components of an example cloud computing environment 800 in which aspects of various embodiments can be implemented. In at least some embodiments, a user 802 wanting to utilize a portion of the resources 814 can submit a request over a network 804 that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like. When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 826, a key management service, a corporate entity, a certificate authority, an identity broker, and the like. In some embodiments, a user can provide information useful in obtaining the credentials, such as user identity, account information, password, user-specific cryptographic key, customer number, and the like. The identity provider can provide the credentials to the resource provider environment 806 and/or to the client device 802, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 822. If the user has an account with the appropriate permissions, status, etc., the resource manager 810 can determine whether there are adequate resources 814 available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 816 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes.

The resource manager 810 (or another such system or service) in this example can also function as a virtual layer of hardware and software components that handles control functions in addition to management actions, as may include provisioning, scaling, replication, etc. The resource manager 810 can utilize dedicated APIs 820 in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 9:
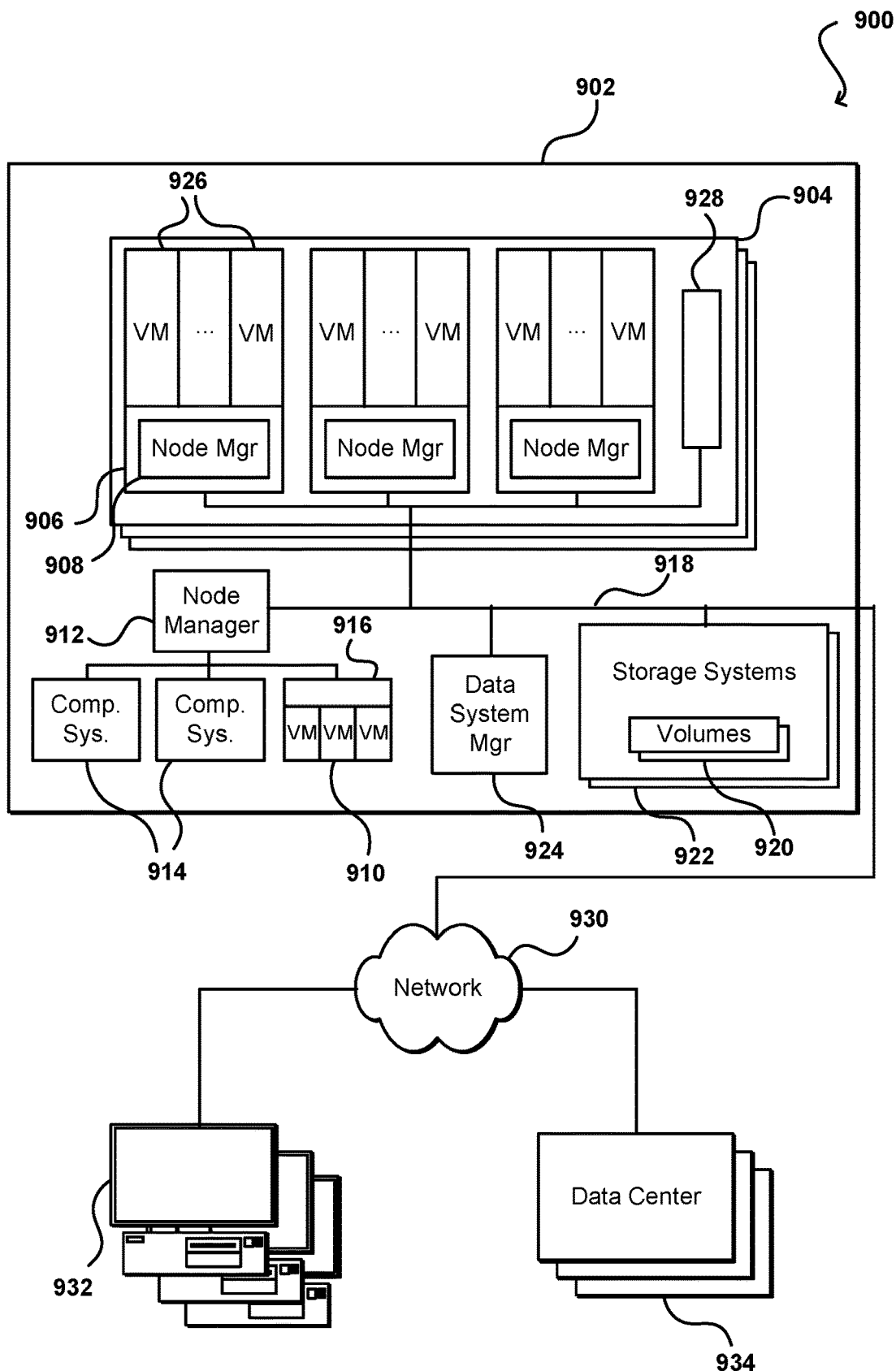
FIG. 9 illustrates components of an example data center that can be utilized in accordance with various embodiments.

FIG. 9 illustrates an example network configuration 900 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 902 includes a number of racks 904, each rack including a number of host computing devices 906, as well as an optional rack support computing system 928 in this example embodiment. The host computing systems 906 on the illustrated rack 904 each host one or more virtual machines 926 in this example, as well as a distinct node manager module 912 associated with the virtual machines on that host computing system to manage those virtual machines. One or more other host computing systems 916 may also each host one or more virtual machines 910 in this example. Each virtual machine 910 may act as an independent resource node for executing one or more program copies or performing another such action or process for user data requests, I/O operations, etc. In addition, this example data center 902 further includes additional host computing systems 914 that do not include distinct virtual machines, but may nonetheless each act as a resource node for one or more tasks being executed for a user. In this example, a node manager module 912 executing on a computing system (not shown) distinct from the host computing systems 914 and 916 is associated with those host computing systems to manage the resource nodes provided by those host computing systems, such as in a manner similar to the node manager modules 908 for the host computing systems 906. The rack support computing system 928 may provide various utility services for other computing systems local to its rack 904 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 902 also includes a computing system 924 that executes a data storage system manager module for the block-based data storage service to assist in managing the availability of non-local block-based data storage to programs executing on resource nodes provided by the host computing systems located within the data center (or optionally on computing systems located in one or more other data centers 934, or other remote computing systems 932 external to the data center). In particular, in this example the data center 902 includes a pool of multiple block-based data storage systems 922, which each have local block-based storage for use in storing one or more volume copies 920. Access to the volume copies 920 is provided over the internal network(s) 918 to programs executing on various resource nodes 910 and 914. As discussed in greater detail elsewhere, a block-based data storage system manager module 924 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 922 may coordinate with the node manager modules 912, 908 to manage use of volumes by programs executing on associated resource nodes, while in other embodiments the node manager modules may not be used to manage such volume use. In addition, in other embodiments, one or more system manager modules 924 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 922 (e.g., in a peer-to-peer manner, without any separate centralized system manager module on a computing system 924).

In this example, the various host computing systems, server block data storage systems, and computing systems are interconnected via one or more internal networks 918 of the data center, which may include various networking devices (e.g., routers, switches, gateways, etc.) that are not shown. In addition, the internal networks 918 are connected to an external network 930 (e.g., the Internet or another public data network) in this example, and the data center 902 may further include one or more optional devices (not shown) at the interconnect between the data center and an external network (e.g., network proxies, load balancers, network address translation devices, etc.). In this example, the data center 902 is connected via the external network 930 to one or more other data centers 934 that each may include some or all of the computing systems and storage systems illustrated with respect to data center 902, as well as other remote computing systems 932 external to the data center. The other computing systems 932 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 9 has been simplified for the purposes of explanation, and that the number and organization of host computing systems, server block data storage systems and other devices may be much larger than what is depicted in FIG. 9. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 9 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 9, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 10:
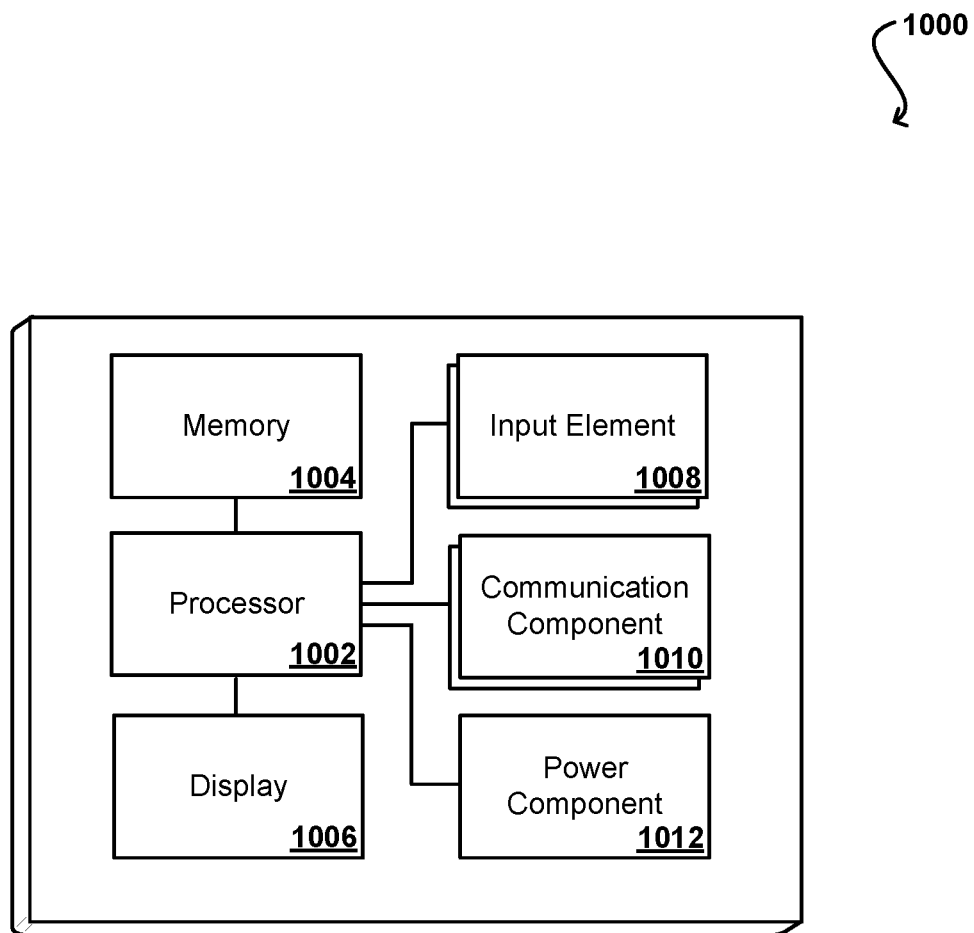
FIG. 10 illustrates components of an example computing device that can be used to perform aspects of the various embodiments.

FIG. 10 illustrates a logical arrangement of a set of general components of an example computing device 1000. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface or communication elements or components 1010 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 1012, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a verification request from a user;
   verifying the user, based at least in part on a first user account associated with a resource provider environment and a second user account associated with at least one separately hosted external resource linked to the resource provider environment to provide a code package;
   receiving, from the verified user, the code package associated with provisioning one or more applications or resources within the resource provider environment;
   formatting the code package for testing within a private testing environment as part of a provisioning template;
   provisioning the private testing environment;
   executing one or more testing procedures, within the private testing environment, on one or more portions of the code package;
   determining a score for the one or more code portions of the code package, based at least in part on the one or more testing procedures, exceeds a passing threshold; and
   providing, for access by one or more second users, the code package within a public repository.

2. The computer-implemented method of claim 1, further comprising:
   assigning the score to the one or more portions of the code package.

3. The computer-implemented method of claim 1, further comprising:
   providing the code package as an extension for inclusion within the provisioning template, the extension being selectable and enabled from the public repository.

4. The computer-implemented method of claim 1, further comprising:
   determining the score for at least a portion of the one or more portions of the code package is below the passing threshold;
   providing a message, to the verified user, regarding the score; and
   receiving an updated code package, the updated code package changing one or more aspects of the code package.

5. The computer-implemented method of claim 1, wherein the code package contains at least provisioning logic to manage a lifecycle of the one or more applications or resources.

6. A computer-implemented method, comprising:
   receiving, at a resource provider environment, an extension for a provisioning template associated with provisioning logic for one or more resources;
   identifying, within the extension, one or more handlers corresponding to one or more operations;
   provisioning a private testing environment using resources associated with a provider of the resource provider environment independent from user resources hosted within the resource provider environment for a user associated with the extension;
   executing one or more testing procedures, within the private testing environment, on at least the one or more handlers;
   assigning a passing score to the extension, based at least in part on the one or more testing procedures; and
   authorizing the extension for distribution.

7. The computer-implemented method of claim 6, further comprising:
  determining the user is a validated user, based at least in part on a first user account with the resource provider environment and a second user account associated with at least one external source.

8. The computer-implemented method of claim 6, wherein the one or more handlers corresponds to a command to perform at least one of a create action, a delete action, an update action, a read action, or a list action on a resource instance.

9. The computer-implemented method of claim 6, wherein the private testing environment is hosted by the resource provider environment.

10. The computer-implemented method of claim 6, wherein the extension includes one or more dependencies for one or more separately hosted resources, further comprising:
  providing an input to the one or more handlers, the input including placeholder information for the one or more dependencies; and
  determining an output from the one or more handlers corresponds to a set of rules associated with the one or more separately hosted resources.

11. The computer-implemented method of claim 6, further comprising:
  storing the extension within a public repository hosted by the resource provider environment;
  providing, to one or more registered users of the resource provider environment, access to the public repository; and
  enabling, for the one or more registered users, discovery of the extension.

12. The computer-implemented method of claim 11, further comprising:
  receiving an update associated with the extension;
  testing, within a second private testing environment, the update; and
  modifying at least a portion of the extension within the public repository, based at least in part on the update.

13. The computer-implemented method of claim 6, further comprising:
  providing, to one or more registered users of the resource provider environment, a search interface to explore items within a public repository;
  receiving a selection, from at least one registered user of the one or more registered users, corresponding to the extension;
  providing, to the at least one registered user, an enablement interface; and
  receiving a command, from the at least one registered user, to enable use of the extension for the at least one registered user.

14. The computer-implemented method of claim 6, wherein the extension is associated with a third-party or open-source resource different from a native resource of the resource provider environment.

15. A system, comprising:
  at least one processor; and
  memory including instructions that, when executed by the at least one processor, cause the system to:
    receive, at a resource provider environment, an extension for a provisioning template associated with provisioning logic for one or more resources;
    identify, within the extension, one or more handlers corresponding to one or more operations;
    provision a private testing environment using resources associated with a provider of the resource provider environment independent from user resources hosted within the resource provider environment for a user associated with the extension;
    execute one or more testing procedures, within the private testing environment, on at least the one or more handlers;
    assign a passing score to the extension, based at least in part on the one or more testing procedures; and
    authorize the extension for distribution.

16. The system of claim 15, wherein the instructions when executed further cause the system to:
  determine the user is a validated user, based at least in part on a first user account with the resource provider environment and a second user account associated with at least one external source.

17. The system of claim 15, wherein the one or more handlers correspond to a command to perform at least one of a create action, a delete action, an update action, a read action, or a list action on a resource instance.

18. The system of claim 15, wherein the private testing environment is hosted by the resource provider environment.

19. The system of claim 15, wherein the instructions when executed further cause the system to:
  provide, to one or more registered users of a resource provider environment, access to a public repository containing the extension; and
  enable, for the one or more registered users, discovery of the extension.

20. The system of claim 15, wherein the instructions when executed further cause the system to:
  provide, to one or more registered users of a resource provider environment, a search interface to explore items within a public repository;
  receive a selection, from at least one registered user of the one or more registered users, corresponding to the extension;
  provide, to the at least one registered user, an enablement interface; and
  receive a command, from the at least one registered user, to enable use of the extension for the at least one registered user.

* * * * *